United States Patent [19]

Sugiyama et al.

[11] Patent Number: 5,295,801
[45] Date of Patent: Mar. 22, 1994

[54] MOLD FOR HOLLOW INJECTION MOLDING

[75] Inventors: Kenji Sugiyama; Hidetaka Fukamachi; Atsuo Kikuchi, all of Aichi, Japan

[73] Assignee: Toyoda Gosei Co., Ltd., Nishikasugai, Japan

[21] Appl. No.: 986,249

[22] Filed: Dec. 7, 1992

Related U.S. Application Data

[62] Division of Ser. No. 731,254, Jul. 17, 1991, Pat. No. 5,198,177.

[30] Foreign Application Priority Data

Jul. 18, 1990 [JP] Japan .................. 2-189738
Mar. 22, 1991 [JP] Japan .................. 3-83498

[51] Int. Cl.$^5$ .......................... B29C 45/22
[52] U.S. Cl. .................. 425/130; 264/572; 425/563; 425/564; 425/566; 425/812
[58] Field of Search ........... 264/328.7, 328.8, 328.12, 264/328.13, 572; 425/130, 562, 563, 564, 566, 812

[56] References Cited

U.S. PATENT DOCUMENTS

| | | | |
|---|---|---|---|
| 4,474,717 | 10/1984 | Hendry . | |
| 4,943,407 | 7/1990 | Hendry | 264/572 |
| 4,990,083 | 2/1991 | Bernhardt | 425/566 |
| 5,044,924 | 9/1991 | Loren | 264/572 |
| 5,069,858 | 12/1991 | Hendry | 264/572 |
| 5,069,859 | 12/1991 | Loren | 264/572 |
| 5,090,886 | 2/1992 | Jaroschek | 425/130 |
| 5,101,858 | 4/1992 | Klotz | 425/566 |
| 5,114,660 | 5/1992 | Hendry | 264/572 |
| 5,127,814 | 7/1992 | Johnson et al. | 425/566 |
| 5,137,680 | 8/1992 | Hendry | 264/572 |
| 5,162,230 | 11/1992 | Ziegler et al. | 264/572 |
| 5,186,884 | 2/1993 | Hendry | 264/572 |

FOREIGN PATENT DOCUMENTS

| | | | |
|---|---|---|---|
| 0363948 | 4/1990 | European Pat. Off. . | |
| 0435025 | 7/1991 | European Pat. Off. . | |
| 2554501 | 8/1976 | Fed. Rep. of Germany | 425/564 |
| 3936289 | 5/1991 | Fed. Rep. of Germany . | |
| 2256021 | 7/1975 | France . | |
| 58-211425 | 12/1983 | Japan . | |
| 0498653 | 1/1939 | United Kingdom | 425/564 |
| 2122130 | 1/1984 | United Kingdom . | |

*Primary Examiner*—Charles S. Bushey
*Attorney, Agent, or Firm*—Cushman, Darby & Cushman

[57] ABSTRACT

A mold for hollow injection molding has an inlet for admitting a fluid into the molten resin when injected to form an interior hollow in the molded product. The inlet is opened and closed by retraction and advancement of a movable pin having at least a portion to fill the inlet and close it. When the inlet is closed, while the resin is being injected, the pin has a portion which projects out of the inlet into the space where the resin is injected. When the inlet is opened, the retraction of the pin leaves a short passageway in the injected resin leading from the fluid inlet for flow thereinto of the hollow-forming fluid. Preferably, the pin is stepped with an inlet-closing large rear portion and a smaller projecting forward portion which is located in and has an annular clearance with the inlet when it is open. The pin may be detachably connected to a movable plunger, operated by fluid or spring pressure, to enable replacement by pins of different lengths, sizes, etc.

12 Claims, 7 Drawing Sheets

MOLD FOR HOLLOW INJECTION MOLDING

This is a division of application Ser. No. 07/731,254, filed Jul. 17, 1991, now U.S. Pat. No. 5,198,177.

FIELD OF THE INVENTION

This invention relates to a mold for hollow injection molding, and more particularly, the construction of a fluid inlet through which a fluid for forming a hollow interior in a molded product is admitted into a cavity containing an injected molten synthetic resin.

BACKGROUND OF THE INVENTION

A hollow molded product of a synthetic resin is made by injecting a molten resin into a mold cavity, and forcing a fluid, such as nitrogen gas or water, into the resin to form a hollow interior.

A known mold for hollow injection molding used for making such a hollow molded product is described in Hendry, U.S. Pat. No. 4,474,717 Oct. 2, 1984, and shown in FIG. 8 herein.

Referring now to FIG. 8, the known mold has a cavity 91 for making a hollow molded product, a sprue 92 for injecting a molten synthetic resin 920 into the cavity 91, and a fluid inlet 931 for admitting a fluid 930 for forming a hollow interior in the molded product. The fluid inlet 931 is defined by the open end of a fluid admitting member 93 which stays in a protruded form in the cavity 91.

The fluid admitting member protruding into the cavity in the known mold, however, allows the synthetic resin 920 to reversely flow into the fluid inlet 931 defined by the fluid admitting member when the resin is injected, or when the fluid is discharged. As a result, the fluid inlet 931 is closed by the synthetic resin 920. Therefore, it has been very difficult to discharge the fluid.

It is possible to prevent the synthetic resin 920 from flowing into the fluid inlet 931 if the cross section of the fluid inlet is very small. This, however, in turn makes it impossible to admit a sufficiently large amount of fluid within a given time.

Providing the fluid admitting member 93 with the fluid inlet 931 necessarily increases the dimensions of the fluid admitting member. A fluid admitting member of such dimensions protruding into the injected resin will deprive the resin of a large amount of heat. The resin which has been deprived of a large amount of heat forms a hardened thick layer contacting the fluid admitting member. This layer prevents fluid from flowing into the synthetic resin through the fluid inlet.

BRIEF SUMMARY OF THE INVENTION

Thus, it is an objection of this invention to provide a mold for hollow injection molding which enables a hollow-forming fluid to flow into a synthetic resin without encountering the above-described difficulties and disadvantages.

This invention includes a mold for hollow injection molding having a cavity for making a hollow molded product from a synthetic resin, a sprue for injecting the resin in a molten state into the cavity, a fluid inlet for admitting a fluid for forming a hollow interior in the molded product, a pin movable longitudinally or axially with respect to the fluid inlet which can be advanced to close the inlet and project therefrom into the resin when it is injected and can be retracted to open the fluid inlet and allow the fluid to flow therethrough into the resin.

DETAILED DESCRIPTION OF THE INVENTION

The most important feature of this invention resides in a pin which advances forward into and retracts rearward out of the fluid inlet to close and open it. The pin is solid, and preferably has a pointed end.

The pin is long enough so that when advanced it will project out of the fluid inlet to be positioned in a layer of the molten synthetic resin which is formed when the resin is injected. The pin may be so designed as to project either into the mold cavity, or into a runner or the sprue. The pin is preferably caused to project out of the inlet so that its projecting portion has a length which is about $\frac{1}{8}$ to $\frac{1}{2}$ of the depth, or width of the mold cavity or the runner or sprue.

A pressure means, such as pneumatic or hydraulic (see FIG. 1), or a spring (see FIG. 4) can be used, for example, to cause the pin to advance.

At least a part of the pin has a cross-sectional shape, such as round or square, conforming to that of the fluid inlet to close it when the pin is advanced. The pin has an appropriate cross-sectional dimension, e.g. diameter, so selected as to ensure a sufficiently large supply of fluid through the fluid inlet when the fluid is admitted, while depriving the synthetic resin of very little heat when the resin is injected.

Figure 5:
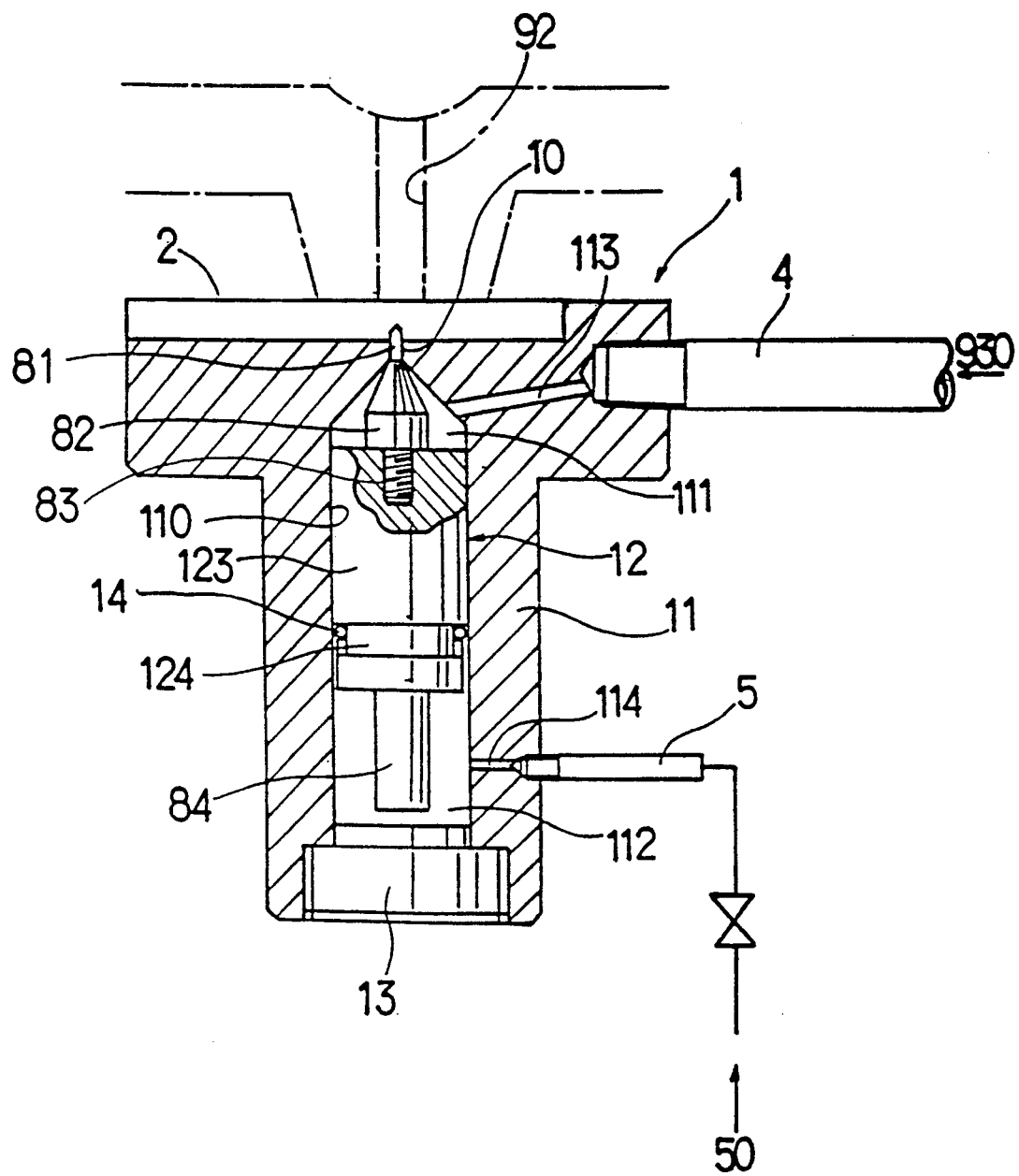
FIG. 5 is a view corresponding to FIG. 1 showing another modification of the invention.
Figure 6:
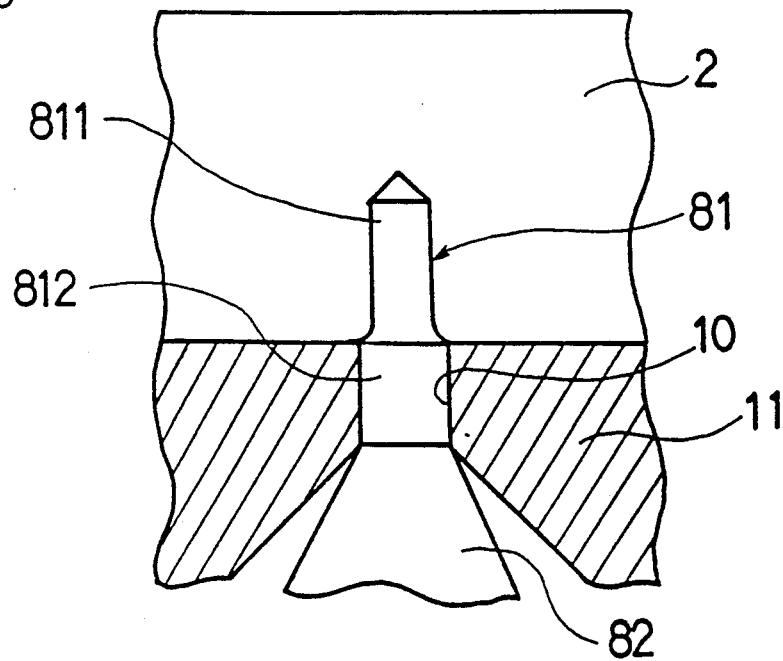
FIG. 6 is an enlarged fragmentary view of a part of FIG. 5 showing the position of the parts when the synthetic resin is injected.
Figure 7:
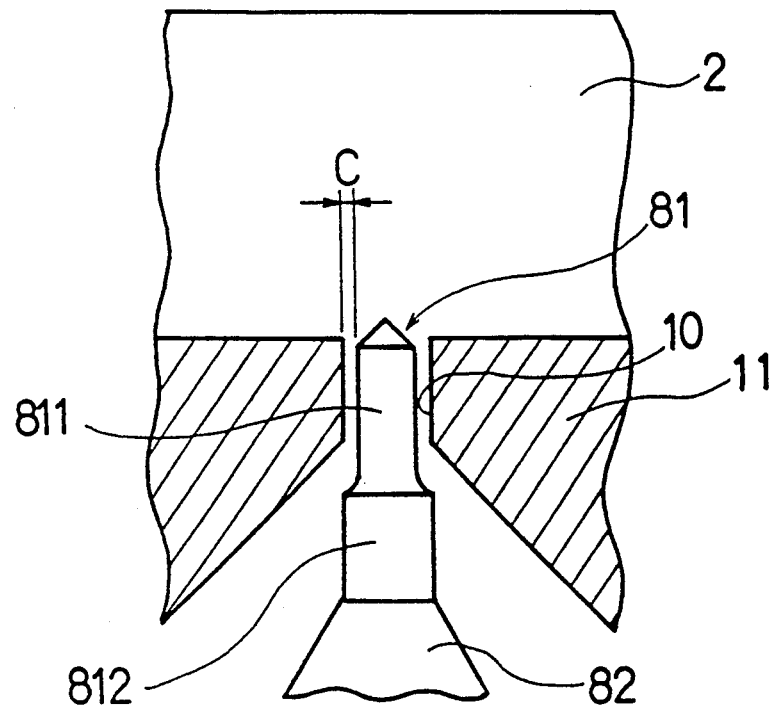
FIG. 7 is a view corresponding to FIG. 6 showing the position of the parts when the hollow-forming fluid has been introduced.
Figure 8:
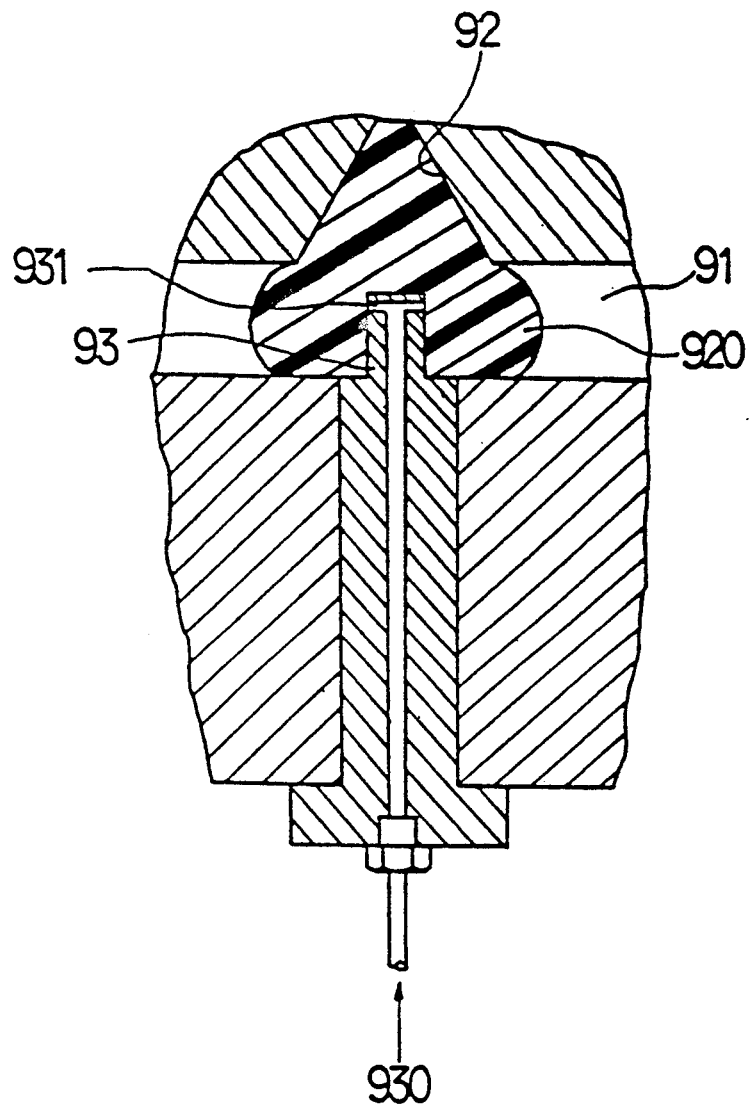
FIG. 8 is an enlarged fragmentary sectional view of a prior art mold for hollow injection molding corresponding to FIG. 1 of the above-referenced Hendry patent.

The pin is preferably of a stepped construction defined by a diametrically large rear portion joined to a diametrically small forward portion (see FIGS. 5, 6 and 7). The diametrically large portion of the pin closes the fluid inlet when the resin is injected. The diametrically small portion forms a clearance between itself and the inner wall surface of the fluid inlet when the fluid is admitted (see FIG. 7).

Thus, the pin has a small diameter at its end, and deprives the synthetic resin of very little heat when the resin is injected. When the fluid is admitted, the diametrically small portion of the pin is positioned within the fluid inlet, so that the resin is inhibited from flowing into the fluid inlet, or is cooled in the fluid inlet. It is, therefore, possible to ensure to a still greater extend that the fluid inlet be kept from being blocked by the resin.

The clearance referred to above is preferably in the range of 0.2 to 0.5 mm. If it is smaller than 0.2 mm, a sufficiently large amount of fluid cannot be obtained. If it is larger than 0.5 mm, the synthetic resin is likely to reversely flow into the clearance when the fluid is injected.

It is desirable to have a plurality of pins which differ from one another in the diameters of their diametrically small portions so as to be removable from and replaceable in the mold for selective use. This arrangement makes it possible to control the fluid amount by altering the dimension of the above-mentioned clearance as desired. A threaded connection (see FIG. 5) can, for example, be employed for removably attaching the selected pin.

In the context of this invention, the synthetic resin includes polypropylene, ABS, polyamide, and soft vinyl chloride resins, for example. The fluid includes a gas such as nitrogen, carbon dioxide, or air, a gas liquefied under high pressure, or a liquid such as water.

The injection of the synthetic resin into the mold of this invention is effected by forcing the molten resin into the cavity through the sprue.

The pin is caused to project through and out of the fluid inlet to be positioned in a layer of the resin to be formed by its injection. The pin has so small a volume that it deprives the resin of very little heat. Therefore, the resin forms practically no hardened layer even near the surface of the pin.

The fluid inlet remains substantially closed by the pin so that no synthetic resin enters the fluid inlet.

When the fluid is admitted, the pin is retracted from the synthetic resin layer to open the fluid inlet.

The retraction of the pin forms a passage extending through the fluid inlet and into the resin layer. This passage allows the fluid to flow smoothly therethrough into the resin, whereby a hollow interior is formed in a mass of the resin.

Thus, the mold of this invention ensures that the fluid is effectively admitted into the mass of the resin to form a hollow interior of a molded product of the mold.

DESCRIPTION OF THE EXAMPLES

Example 1

Figure 1:
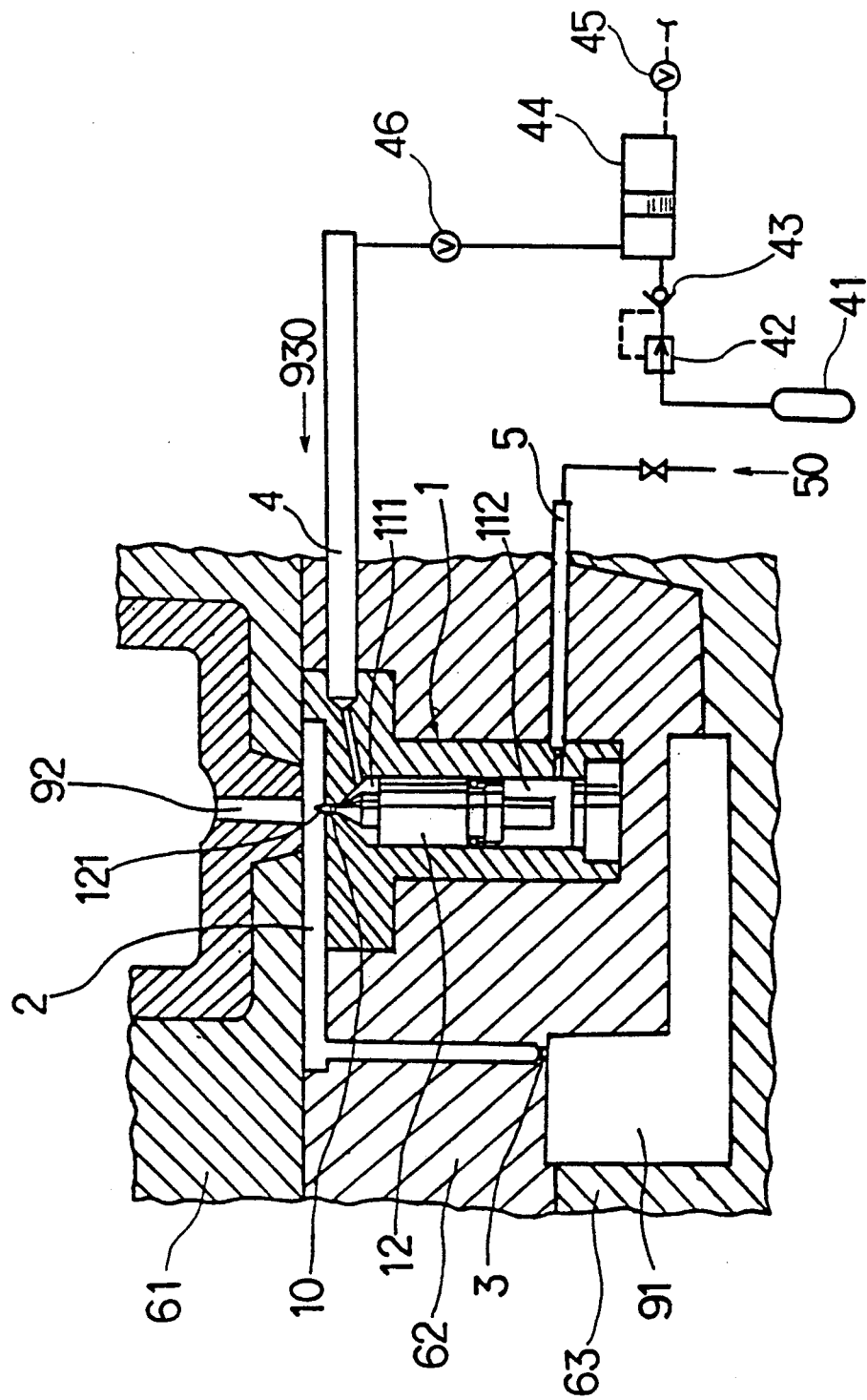
FIG. 1 is a fragmentary sectional view of a mold embodying this invention.
Figure 2:
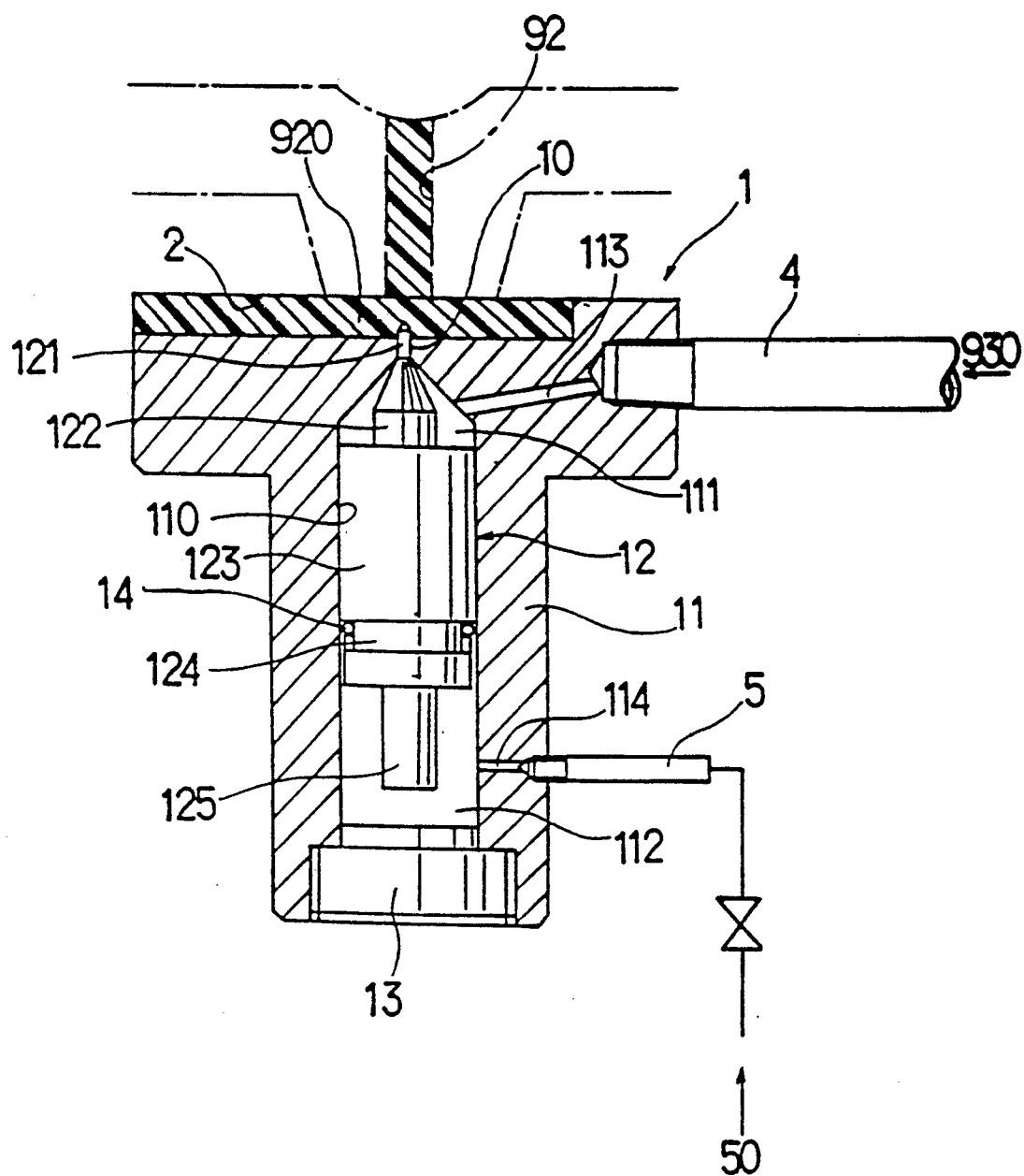
FIG. 2 is an enlarged sectional view of a part of the mold shown in FIG. 1 showing the position of the parts when the synthetic resin has been injected.
Figure 3:
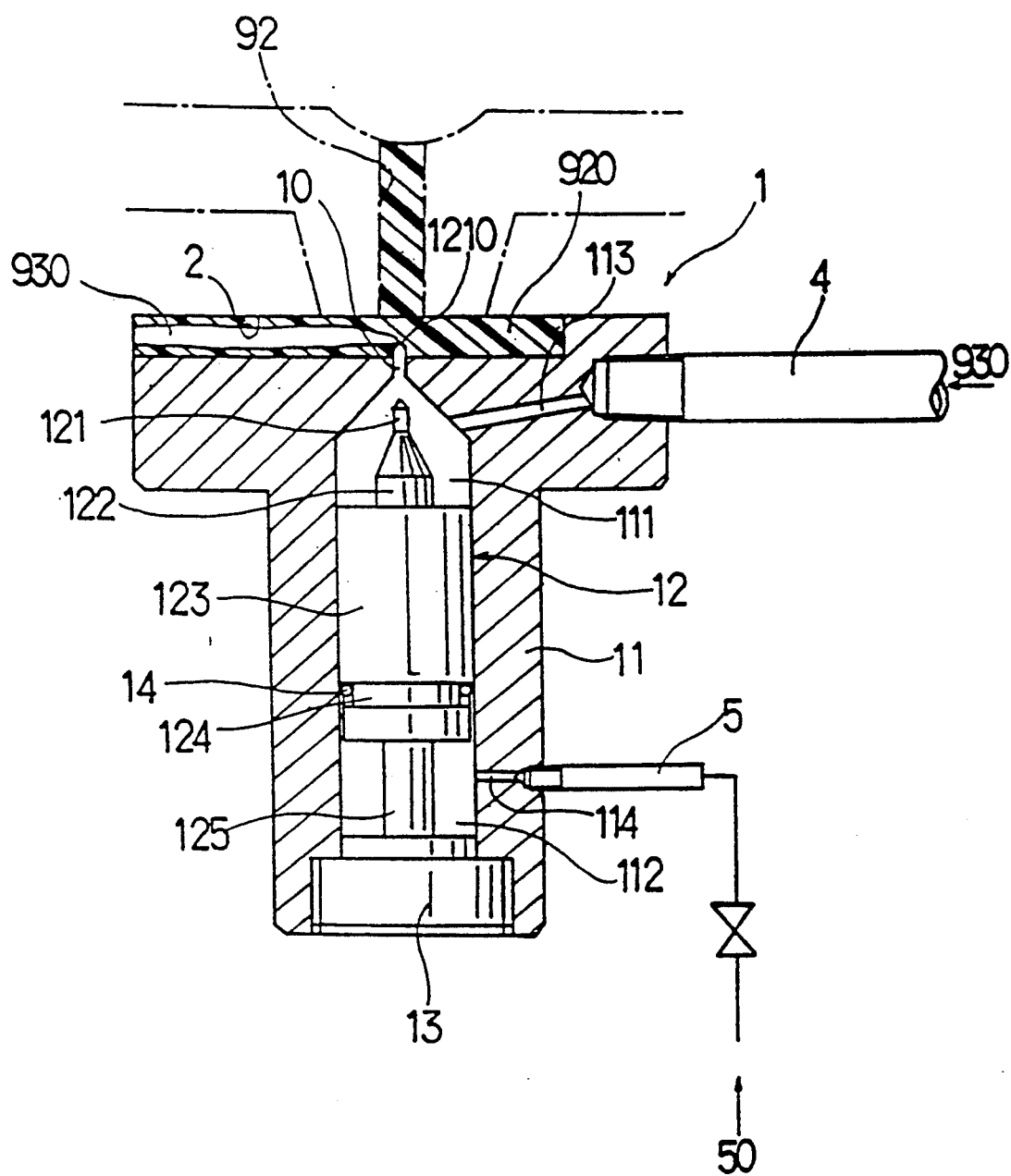
FIG. 3 is a view corresponding to FIG. 2 showing the position of the parts when the hollow-forming fluid has been introduced.

Referring to FIGS. 1 to 3, the mold has a cavity 91 for making a hollow molded product from a synthetic resin 920, a sprue 92 for injecting the resin in a molten state into the cavity, and a fluid inlet 10 for admitting a fluid 930 for forming a hollow interior in the molded product, as shown in FIGS. 1-3.

The fluid inlet 10 is provided with a conforming pin 121 movable axially forward into and rearward out of the inlet. The pin 121 is so designed as to project, when forward, out of the fluid inlet 10 into a layer of the resin 920 and close the fluid inlet when the resin is injected. When the fluid is admitted, the pin 121 is retracted out of the fluid inlet 10 to allow the fluid 930 to flow through the fluid inlet into the resin 920, as will hereinafter be described in further detail.

The sprue 92 is formed in a mold portion 61. A runner 2, which will hereinafter be described in further detail, is defined between the mold portion 61 and another mold portion 62. The cavity 91 is defined between the mold portion 62 and still another mold portion 63.

The fluid inlet 10 faces the runner 2, as shown in FIG. 1. The runner 2 connects a gate 3 formed at the inlet of the cavity 91 and the sprue 92.

The fluid inlet 10 is defined by an injection nozzle 1 fitted in the mold portion 62.

The injection nozzle 1 comprises a nozzle body 11 defining a cylinder bore 110 therein, a plunger 12 fitted axially movably in the cylinder bore, and a cap 13 connected threadedly to the nozzle body 11 opposite the fluid inlet 10, as shown in FIGS. 2 and 3. The injection nozzle 1 has also a recess partly defining the runner 2.

The plunger 12 comprises a large portion 123 which is slidable in the cylinder bore 110, a small tapered portion 122 and the pin 121, both of which extend from the large portion 123 toward the fluid inlet 10, a seal portion 124 extending from the diametrically large portion 123 toward the cap 13, and a stop portion 125. The seal portion 124 is provided with a sealing material 14, such as an O-ring.

The pin 121 is solid, has a pointed end and has a diameter which is substantially equal to the inside diameter of the fluid inlet 10.

The pin 121 is long enough to project, when forward, out of the fluid inlet 10 into the layer of the synthetic resin 920 which is formed by its injection. More specifically, the pin 121 is so long that, when it has been caused to so project, its projecting portion has a length which is equal to about ⅓ of the diameter or width of the runner 2. The pin 121, when projected, and the fluid inlet 10 have a clearance of about 0.01 mm therebetween. When it is necessary to admit the fluid, the pin 121 is retracted out of and opens the fluid inlet 10.

The cylinder bore 110 defines a fluid admitting chamber 111 surrounding the small tapered portion 122. A fluid admitting nozzle 4 is connected to the fluid admitting chamber 111 by a passage 113. The fluid 930, such as nitrogen gas, is supplied to the fluid admitting nozzle 4 when it is necessary to admit the fluid.

The cylinder bore 110 also defines a control chamber 112 surrounding the stop portion 125. A control fluid supplying nozzle 5 is connected to the control chamber 112 by a passage 114. A control fluid 50, such as air or oil, is supplied to the nozzle 5.

FIG. 1 further shows a bottle 41 containing the fluid, such as nitrogen gas, a pressure reducing valve 42, a check valve 43, an accumulator 44 including a piston for compressing the fluid, and two electromagnetic valves 45 and 46.

The following is a description of the mode in which the mold as hereinabove described is used for making a hollow product of injection molding, and of the advantages which it affords.

Prior to the injection of the synthetic resin, a jet of the control fluid 50 is supplied into the control chamber 112 through the control fluid supplying nozzle 5. As a result, the plunger 12 is advanced to move the pin 121 into and close the fluid inlet 10, as shown in FIGS. 1 and 2, with the end of the pin projecting into the runner 2.

The molten synthetic resin 920 then is injected into the runner 2 through the sprue 92. The resin 920 which has been injected into the runner 2 flows therethrough and supplies a short shot of material into the cavity 91.

The pin 121 is, therefore, situated in a layer of the synthetic resin. Since the fluid inlet 10 is closed by the pin 121, none of the resin 920 enters the fluid inlet.

The pin 121 has a very small volume as compared with the volume of the resin 920 flowing in the runner 2. The pin 121 has an even smaller volume at its pointed end. Therefore the pin 121 deprives the resin of practically no heat, and the resin 920 forms practically no hardened layer even in the vicinity of the end of the pin 121.

The control fluid 50 then is drained or removed from the control chamber 112 prior to the injection or admission of the fluid 930. Then, the fluid 930 is supplied from the bottle 41 to the fluid admitting nozzle 4 through the accumulator 44, and a jet of the fluid 930 is injected from the nozzle 4 into the fluid admitting chamber 111. As the fluid inlet 10 remains closed by the pin 121, an elevated pressure is created in the fluid admitting chamber 111 and causes the plunger 12 to retract. The retraction of the plunger 12 continues until its stop portion 125 abuts on the cap 13.

As a result, the pin 121, a portion of which is positioned in the layer of the resin, retracts therefrom and out of the fluid inlet 10 to open the same, as shown in FIG. 3. The retraction of the pin 121 leaves a passage 1210 in the resin extending from the fluid inlet 10, the wall of which passage is soft because the resin is still substantially in its molten state.

Therefore, the fluid 930 flows from the fluid admitting chamber 111 to the passage 1210, and is smoothly forced into the synthetic resin 920 through that end of the passage 1210 which is situated in the resin. The fluid 930 flows through the resin 920 into the cavity 91 and forms the hollow interior of a hollow molded product of the resin.

Then, the fluid is discharged from the hollow interior formed by the resin 920, and is collected into the accumulator 44 through the nozzle 4 and the electromagnetic valve 46 (FIG. 1).

Thus, a mold embodying this invention ensures that the fluid 930 be effectively forced into the synthetic resin 920, as hereinabove described. It is possible to alter the site at which the fluid 930 is forced into the resin by selectively using one of a plurality of pins 121 having different lengths.

As hereinabove described, the pin 121 is retracted from the fluid inlet 10 prior to the injection of the fluid, and the resin is allowed to be cooled and hardened after the retraction of the pin 121, admission and withdrawal of the fluid. Therefore, the pin 121 does not hinder the separation of the molded product from the mold.

It is, therefore, possible to position the pin 121, or form the fluid inlet 10, in any other part of the mold having a complicated shape. It is possible to position the pin 121 in any appropriate location.

The compressed fluid which has been used for forming the hollow interior of the molded product is easy to collect for reuse, as is obvious from the foregoing.

Example 2

Figure 4:
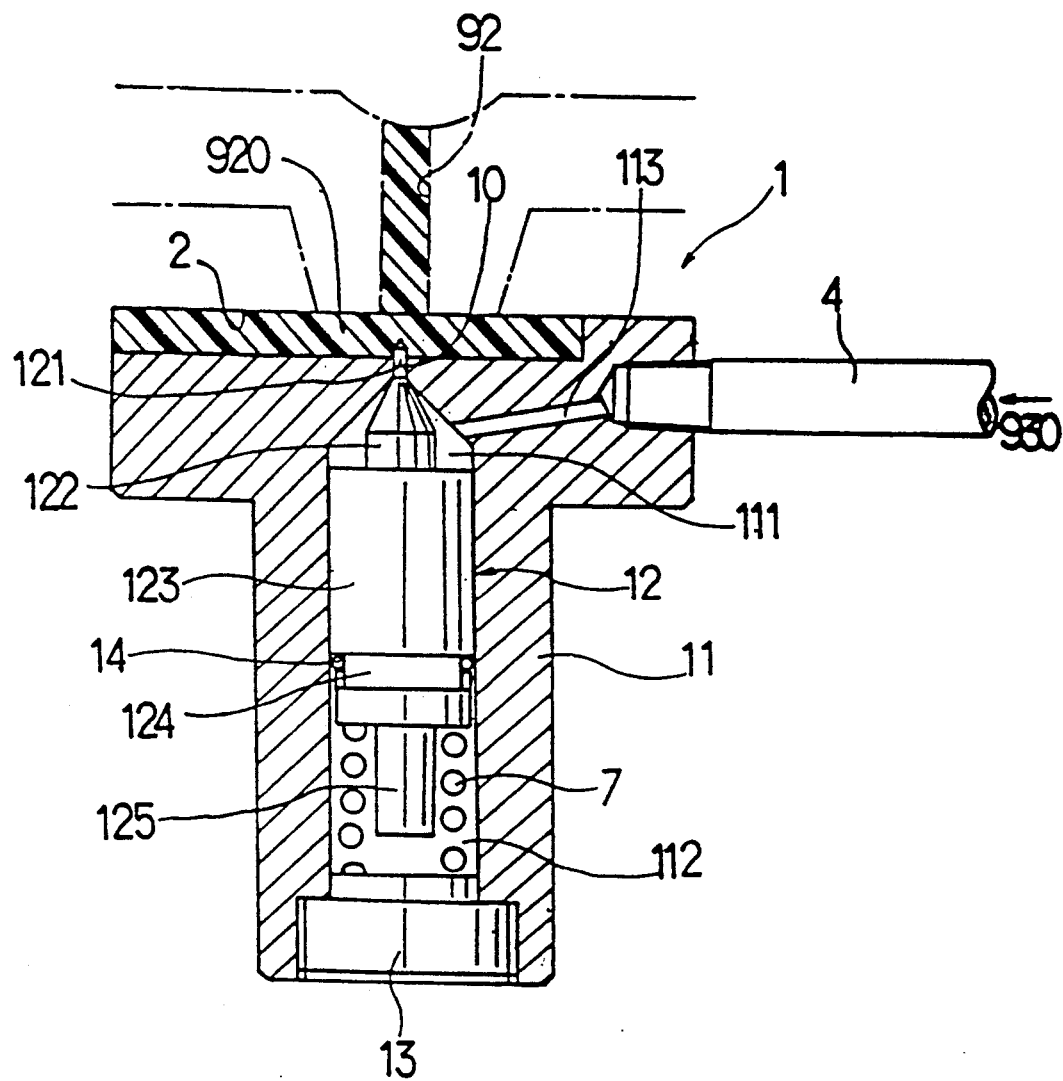
FIG. 4 is a view corresponding to FIG. 2 showing a modification of the invention.

Another mold for hollow injection molding embodying this invention is shown in FIG. 4. The mold is provided with a coil compression spring 7 in the control chamber 112 for causing the pin 121 to project and close the fluid inlet 10 instead of using a control fluid 50 as in Example 1.

In all other respects, the mold is identical to that of Example 1.

The following is a description of the mode in which the mold is used, and of the advantages which it affords.

The spring 7 urges the plunger 12 to advance when the synthetic resin is going to be injected. As a result, the pin 121 projects through and closes the fluid inlet 10.

When the fluid 930 is forced through the fluid admitting nozzle 4, it increases the pressure in the fluid admitting chamber 111 sufficiently to overcome the closing force of the spring 7 and retract the plunger 12. As a result, the pin 121 opens the fluid inlet 10, while forming the aforementioned passage in the layer of the resin 920.

In all other respects, the mold is used in the same way as is the mold of Example 1, and affords the same advantages as those offered thereby.

Example 3

Still another mold embodying this invention is shown in FIGS. 5 to 7. This mold is featured by a pin 81 having a stepped shape.

The pin 81 comprises a diametrically large rear portion 812 for closing the fluid inlet 10 when the synthetic resin is injected, and a diametrically smaller forward portion 811 to project out of the inlet into the resin as shown in FIG. 6. The diameter of the small portion 811 of the pin 81 is such that there is a clearance C, between it and the inner wall surface of the fluid inlet 10, of 0.3 mm when the pin is retracted.

The tapered portion 82 between the pin 81 and the plunger 12 has a projection 83 threadedly engaged in a socket in the plunger so as to be detachable therefrom as shown in FIG. 5.

The length of the stop portion 84, i.e. the distance between it and the cap 13 when the fluid inlet 10 is closed by the pin 81, is arranged so that the diametrically small portion 811 of the pin 81 will stay in the fluid inlet 10 when the pin 81 has been retracted.

In all other respects, the mold is identical to the mold of Example 1.

The following is a description of the mode in which the mold of Example 3 is used, and of the advantages which it affords.

When the synthetic resin is going to be injected, the plunger 12 is advanced, as shown in FIGS. 5 and 6. As a result, the diametrically small portion 811 of the pin 81 projects out of the fluid inlet 10 to be positioned in the space where a layer of the resin will be formed. By virtue of its small diameter, the portion 811 is still less likely to deprive the resin of heat. The diametrically large portion 812 of the pin 81 closes the fluid inlet 10.

Introduction of the fluid retracts the plunger 12. As a result, the diametrically large portion 812 of the pin is retracted from the fluid inlet 10, as shown in FIG. 7. The diametrically small portion 811 of the pin now stays in the fluid inlet 10 and the clearance C is formed between the inner wall surface of the fluid inlet 10 and the diametrically small portion 811 of the pin. The clearance C allows the fluid to flow therethrough into the synthetic resin.

When the fluid is introduced, the diametrically small portion 811 of the pin staying in the fluid inlet 10 prevents the synthetic resin from flowing into the fluid inlet 10. Therefore, it is possible to keep the fluid inlet 10 from being blocked by the synthetic resin.

The mold of Example 3, therefore, enables a still easier introduction of the fluid. Any film which is formed by the resin hardened in the fluid inlet 10 is removed with the hollow molded product when it is separated from the mold.

It is possible to alter the width of the clearance C as desired by preparing a plurality of pins 81 which differ from one another in the diameters of their diametrically small portions 811 for selective attachment by the threaded connection to the plunger 12. This makes it possible to control the amount of the fluid flowing through the clearance C.

It will thus be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, this invention includes all embodiments encompassed within the spirit and scope of the following claims.

What is claimed is:

1. A mold for hollow injection molding comprising:
    means defining a cavity for making a hollow molded product from a synthetic resin;
    a sprue for injecting resin in a molten state into said cavity,
    a fluid inlet for admitting a fluid into the injected resin for forming a hollow interior in the product; and
    pin means movable longitudinally with respect to said fluid inlet to advance and close said fluid inlet and project therefrom into the resin when it is injected, and to retract and open said fluid inlet to allow the fluid to flow therethrough into the injected resin.
2. The mold defined in claim 1, wherein the pin means comprises a diametrically large portion for closing said fluid inlet and a diametrically small portion for projecting into the injected resin when said pin means is advanced and for defining a clearance between itself and the inner wall surface of the fluid inlet when said pin means is retracted to admit the fluid.
3. The mold defined in claim 1, wherein the pin means has a pointed end.
4. The mold defined in claim 2, wherein the pin means is connected to and movable by an axially movable plunger.
5. The mold defined in claim 4, wherein the pin means is removably connected to the plunger.
6. The mold defined in claim 4 including pressure means to move the plunger to advance the pin means.
7. The mold defined in claim 6 wherein the pressure means is a pressure fluid.
8. The mold defined in claim 1, wherein the end of the pin means is projectable into the cavity.
9. The mold defined in claim 1, including a runner and wherein the end of the pin means is projectable into the runner.
10. The mold defined in claim 1, wherein the end of the pin means is projectable into the sprue.
11. The mold defined in claim 2, wherein the clearance is 0.2 mm to 0.5 mm.
12. A mold for hollow injection molding as in claim 2, wherein the large and small portions are integral.

* * * * *